2,929,727
GLASS COMPOSITIONS AND GLASS-TO-METAL SEALS

Lucy Florence Oldfield, Harrow Weald, England, and John Henry Partridge, deceased, late of Pinner, England, by Ethel Partridge and Michael John Anthony Partridge, administrators, Pinner, England, assignors to The General Electric Company Limited, London, England, a British company No Drawing. Application May 13, 1957
Serial No. 658,531

Claims priority, application Great Britain May 14, 1956

9 Claims. (Cl. 106—52)

This invention relates to glasses suitable for sealing directly to metals and alloys of the high thermal expansion type, that is to say having mean coefficients of thermal expansion in the range of about 17 to $27 \times 10^{-6}$ cm./cm./degree centigrade over a temperature range of about 20° C. to 450° C. The invention also relates to glass-to-metal seals produced by sealing these glasses to metals and alloys of the said type, and to electrical devices incorporating such seals.

Metals and alloys of expansion characteristics within the above-mentioned range include, for example, copper, silver, aluminium, and high expansion austenitic steel, and the invention is particularly concerned with glasses suitable for sealing to these metals. Such metals and alloys may be employed in some electrical devices, for example for forming the envelope or a part of the envelope of a device or for leading-in conductors. Hence glass-to-metal seals of the kind which the invention is concerned may be required in the manufacture of such devices.

It is well known that in order to obtain satisfactory glass-to-metal seals with little or no stress in the vicinity thereof it is desirable that the thermal expansion characteristics of the glass and of the metal or alloy used should be closely matched to one another over the range of temperatures to which the seal is subjected in manufacture and in operation of the device of which the seal forms part. It is difficult to obtain a commercially useful glass having a sufficiently high thermal expansion coefficient to enable satisfactory seals to be formed with metals and alloys of the type specified, and it is an object of the present invention to provide a range of glass compositions of this kind.

It is desirable for glasses used in electrical devices to possess high electrical resistivity, so that the glass is effective as an insulator for the metal parts to which it is sealed; it is also desirable for glasses so employed to possess high durability with respect to fluctuating temperature conditions, and resistance to attack by moisture and by chemicals, especially dilute mineral acids, which may be employed for washing the metal components of electrical devices. Accordingly it is a further object of the invention to provide a range of glass compositions having these properties in addition to the high expansion characteristics referred to above.

According to the invention, a glass suitable for sealing directly to a high thermal expansion metal or alloy has a composition in the range of 32% to 50% silica ($SiO_2$), 4% to 27% sodium oxide ($Na_2O$), 4% to 27% potassium oxide ($K_2O$), 0 to 5% lithia ($Li_2O$), 2% to 8% barium oxide (BaO), 2% to 8% strontium oxide (SrO), 4% to 30% titanium dioxide ($TiO_2$), 0 to 7% zinc oxide (ZnO), 0 to 2% zirconia ($ZrO_2$), and 0 to 2% alumina ($Al_2O_3$), the total content of alkali metals oxides ($Na_2O+K_2O+Li_2O$) being 29% to 33%, the total content of alkaline earth metal oxides (BaO+SrO) being 4% to 16%, the total content of $TiO_2+ZnO$ being at least 11%, and the total content of $SiO_2+TiO_2$ being not less than 46%.

The proportions of sodium and potassium oxides are preferably in the ranges of 12% to 18% $Na_2O$ and 11% to 15% $K_2O$; preferably also more than half the alkali metal oxide content consists of $Na_2O$ if no lithia is present.

Glasses in accordance with the invention which are characterised by particularly good durability with respect to the effects of temperature changes, moisture, and acids, are those having compositions in the range of 42% to 50% silica ($SiO_2$), 29% to 33% alkali metal oxides ($Na_2O+K_2O$) of which not less than half the total is sodium oxide, 4% to 10% alkaline earth metal oxides (BaO+SrO), 14% to 30% titanium dioxide ($TiO_2$), and 0 to 2% zinc oxide (ZnO). The glasses within this restricted range of compositions will hereinafter be referred to as "high durability" glasses.

All percentages referred to in this specification and in the appended claims are by weight, and the ranges of compositions referred to above are inclusive of the end figures quoted for each constituent.

It will be understood that in addition to the constituents specified the glasses might in some cases contain trace impurities derived from impurities in the raw materials used for the manufacture of the glasses; such traces are usually innocuous but the amount of such an impurity present should, of course, never be allowed to be so large as to detract from the desired properties of the glass. In addition, a small proportion of colouring material might in some cases be deliberately added to the glass composition, for example if the glass is required to possess low visible transmission or to be coloured for any purpose, for example for classification. The colouring material might, for example, consist of one or more of the oxides of manganese, chromium, nickel, vanadium, tungsten, iron, copper and cobalt, but should not in general be present in an amount appreciably greater than 1% of the glass composition, and is preferably substituted fo ran equivalent weight of silica in the compositions specified above.

It is to be noted that the ranges of compositions specified above refer to the composition of the glass after founding. It will be appreciated that an analysis of a glass will in most cases show that its actual composition differs slightly in some respects from the composition calculated from the starting materials used, as a result of changes in composition which may occur during founding due to the loss of part of one or more constituents by volatilisation or to corrosion, by the molten glass, of the refractory material of which the glass-melting pots or tank furnace walls are formed, resulting in the incorporation of small proportions of said material in the glass. It will also be appreciated that for obtaining a glass of composition as close as possible to the required composition, it will be necessary when preparing the initial batch of raw materials to take into account such changes in composition which may occur during founding and to adjust the composition of the starting batch accordingly, in conventional manner.

Thus owing to the high alkali content of the glasses of the present invention, appreciable, and sometimes considerable, loss of alkalis by volatilisation is liable to occur during founding, and therefore it is usually necessary to include in the batches from which these glasses are made larger proportions of alkali metal compounds than those required to produce the oxides in the proportions desired in the final product. In some cases it may also be necessary to include in the batch a smaller proportion of alumina than that required in the glass to allow for incorporation in the glass of alumina from the material of the pot or tank in which the founding is carried out.

For the manufacture of a glass in accordance with the present invention, the batch may be made up of any suitable ingredients commonly used in the glass-making industry for providing the various constituent oxides of the glass. For example, in addition to sand the batch usually includes the carbonates of the alkali metals and alkaline earth metals while titanium dioxide and optionally the oxides of zinc, zirconium and aluminum may be employed. Preferably a part of the alkali content of the batch is introduced in the form of one or more alkali metal nitrates, to ensure that oxidising conditions are maintained during founding, thus preventing reduction of the titanium dioxide. The batch may include zirconia if an opaque glass is required, and small amounts of colouring oxides as aforesaid if a coloured glass is required.

The proportions of those ingredients of the batch which furnish the alkali metal oxides and alumina may be adjusted as necessary to compensate for losses and gains during founding, as indicated above. However, by carrying out the founding under carefully controlled temperature conditions, and in a pot or tank composed of material not subject to appreciable corrosion by the molten glass, it is possible to produce a glass having an analytical composition very close to its nominal composition, with little adjustment of the batch composition. The glasses of the invention are readily produced in a clear state, free from seed and cord, by founding at relatively low temperatures, for example 1300° C. to 1350° C., and for relatively short periods of time, for example 3 to 4 hours for a quantity of 70 kgms. A convenient working temperature for these glasses, for the fabrication of ware, is about 1000° C., and the glass is cooled from the founding temperature to the working temperature in about ½ to 1 hour.

The glasses having compositions in the range specified according to the invention are characterised by possessing exceptionally high coefficients of thermal expansion, which render them suitable for sealing to metals and alloys of the type specified. Thus for all these glasses the mean coefficient of thermal expansion over the temperature range from 20° C. to the Mg point of the glass is in the range of 16.0 to $18.5 \times 10^{-6}$ cm./cm./° C. (The Mg point of a glass is the highest temperature attainable on the thermal expansion-temperature curve obtained with a rod of the glass, above which temperature the glass is deformed at a rate similar to its rate of expansion, by the small pressure exerted on the rod by the optical lever or dial gauge against which it abuts in the apparatus used for determining the expansion, the rod usually being supported horizontally if an optical lever is used and vertically if a dial gauge is used.)

It will be appreciated that for sealing to any specified metal or alloy among those of the type specified the glass composition may be selected to give the most suitable expansion characteristic: for example, glasses whose mean coefficients of thermal expansion over the temperature range from 20° C. to the Mg point are in the respective ranges of 16.0 to 17.0, 16.5 to 18.5, and 17.0 to $18.5 \times 10^{-6}$ cm./cm./° C. are preferred respectively for sealing to high expansion austenitic steels, for sealing to copper, and for making compression seals with aluminium. The expansion coefficients of the glasses may be controlled, within the range of 16.0 to $18.5 \times 10^{-6}$ cm./cm./° C., by varying the contents of alkali metal oxides and divalent metal oxides, the expansion coefficient being raised by increasing the proportions of any of these constituents present. If the total alkali content is at or near the lower limit of the range specified, the total (BaO+SrO) is preferably at or near the upper limit of the range given for this combination of oxides, and vice versa.

Steels of the kind referred to have mean coefficients of thermal expansion of about 17.0, 17.2 and $17.5 \times 10^{-6}$ cm./cm./° C., respectively over the temperature ranges, 20° C. to 400° C., 20° C. to 450° C. and 20° C. to 500° C., and the said coefficients for copper over the same temperature ranges are respectively 17.9, 18.1 and $18.3 \times 10^{-6}$ cm./cm./° C., so that the range of expansion characteristics covered by the glasses of the invention corresponds quite closely to those of these metals. For forming the most satisfactory seals with copper and austenitic steel respectively, the glasses used should be those whose maximum coefficients of thermal expansion are, respectively, greater than $17.0 \times 10^{-6}$ cm./cm./° C. and greater than $16.5 \times 10^{-6}$ cm./cm./° C., this maximum occurring at a temperature at which the glass can anneal rapidly, in most cases between 400° C. and 500° C.

In the cases of silver and aluminium, whose mean thermal expansion coefficients over the respective ranges 20° to 400° C., 20° to 450° C., and 20° to 500° C. are respectively, for silver 20.3, 20.45, $20.6 \times 10^{-6}$ cm./cm./° C., and for aluminium 26.1, 26.5, $27.0 \times 10^{-6}$ cm./cm./° C., compression seals can be formed with the glasses of the invention.

For the glasses with which the present invention is concerned the Mg point is in the range of 410° C. to 505° C., the glasses of higher alkali content, and those containing lithia, being characterised by having Mg points towards the lower end of this range. The glasses are further characterised by possessing a wide annealing range, extending over about 80 to 100° C., the upper annealing temperature in each case being about 10° C. below the Mg point. These glasses are thus capable of being annealed at temperatures considerably below the Mg point, resulting in the release of compressive stress at relatively low temperatures, for example at 400° C. to 420° C. or even lower: this property is valuable in that it facilitates the formation of satisfactory glass-to-metal seals even in cases where the expansion characteristics of the metal and glass are not very closely matched.

All the glasses of the invention possess reasonably good durability, those having compositions in the restricted range specified above being particularly advantageous in this respect, as aforesaid.

The tests employed for determining the durability of these glasses consist essentially in boiling two samples of the glass, for one hour respectively in distilled water and in dilute hydrochloric acid containing 20 ml. of HCl in 100 ml. of the solution. The samples are wiped dry gently with paper tissues, heated in air to a temperature below 80° C., and examined under a low power microscope for surface leaching and other defects. The samples are then heated at 150° C. for 30 minutes, and re-examined. A glass so treated is considered to possess "good" durability if both of the samples show only slight pitting or crazing, to a penetration of less than one thousandth of an inch, visible at a magnification of 10, with no surface breakdown, and solution of less than 0.5% by weight of the glass. If negligible pitting or crazing is apparent at a magnification of 10, although these effects may be detectable at a magnification of 30, and solution of the glass is negligible, that is say not more than a few milligrams dissolved from 10 grams of glass, the durability of the glass is regarded as "excellent." The examination of the samples is carried out on freshly broken surfaces, which are less durable than fire polished surfaces; in some cases fire polished surfaces are also examined since the durability of such surfaces is of interest in relation to fabricated glassware.

The good durability of the glasses of the present invention results from the inclusion of a high proportion of titanium dioxide (14% to 30% in the cases of the high durability glasses) this being an important feature of the glass compositions in accordance with the invention: the titania content should be in the upper region of the range specified if the total alkali content is at or near the maximum specified. The durability may also be increased by increasing the ratio of potassium oxide to sodium oxide, and zinc oxide, alumina and zirconia may also make a limited contribution to improved durability, for example if the titania content is not particularly high. The optimum composition employed in any particular case for improving the durability depends upon the requirements with regard to other properties affected by the various constituents.

The glasses of the invention possess electrical resistivities in the range of $10^{10}$ to $10^{13}$ ohm cm. at 100° C. The actual values of the resistivities, within these ranges, depend upon the proportions of alkali metal oxides and alkaline earth metal oxides present in the glass, the resistivity being increased by increasing the barium oxide and strontium oxide contents and by decreasing the amounts of alkali metal oxides, especially sodium oxide.

Another property of the glasses of the invention which enhances their suitability for sealing to the metals and alloys referred to is their ability to flow readily at relatively low temperatures. This is indicated by the low fibre softening points of the glasses, the fibre softening point being the temperature at which the glass possesses a viscosity of $10^{7.6}$ poises: for example, some glasses in accordance with the invention have been found to have fibre softening points in the range of 525° C. to 590° C. This property of fluidity is particularly important for the formation of seals with aluminium, for some of the glasses of the invention are sufficiently fluid at temperatures below 660° C. (which is the melting point of aluminium) to form a satisfactory seal with aluminium. In order to ensure that a glass is suitable in this respect for sealing to aluminium, the silica content must be not greater than 45%: this gives glasses which will flow readily below 650° C. The viscosity of the glasses at low temperatures may also be reduced by increasing the proportions of alkali metal oxides and divalent oxides present.

The glasses of the invention have good working properties, and show little or no tendency to devitrify during working: freedom from devitrification is ensured by the inclusion of both barium oxide and strontium oxide in the proportions specified. Furthermore a predominance of the $Na_2O$ content over that of $K_2O$, if lithia is absent, is advantageous in that it tends to improve the quality of the glass, that is to say it tends to reduce or eliminate the presence of cord.

The nominal compositions of some specific glasses, designated by the numbers 1 to 16 inclusive, in accordance with the invention are indicated by way of example in the following table (Table 1), the proportions of the constituent oxides being given in percentages by weight. The table also shows some of the properties of these glasses, including the mean coefficients of thermal expansion ($\alpha$) for the temperature ranges 20° C. to 350° C., 20° C. to 400° C., 20° C. to 450° C. and 20° C. to Mg point, the Mg points, fibre softening points, and the electrical resistivity ($\rho$, in ohm cm.) expressed as the value of $\log_{10} \rho$ at various temperatures.

Table 1

| | 1 | 2 | 3 | 4 | 5 |
|---|---|---|---|---|---|
| Constituent oxides: | | | | | |
| $SiO_2$ | 42.0 | 45.0 | 42.0 | 45.0 | 48.0 |
| $Li_2O$ | | | 3.0 | | |
| $Na_2O$ | 17.0 | 17.0 | 15.0 | 17.0 | 17.0 |
| $K_2O$ | 14.0 | 13.0 | 13.0 | 13.0 | 13.0 |
| BaO | 3.0 | 4.0 | 3.0 | 5.0 | 5.0 |
| SrO | 4.0 | 4.0 | 4.0 | 6.0 | 6.0 |
| $TiO_2$ | 20.0 | 16.0 | 15.0 | 13.0 | 8.0 |
| ZnO | | 1.0 | 3.0 | 1.0 | 3.0 |
| $ZrO_2$ | | | 2.0 | | |
| $Al_2O_3$ | | | | | |
| Properties: | | | | | |
| Durability | Excellent | Excellent | good | good | good |
| $\alpha 20$-350×$10^{-6}$ cm/cm/°C | 14.6 | 14.3 | 15.27 | 14.1 | 14.58 |
| $\alpha 20$-400×$10^{-6}$ cm/cm/°C | 15.2 | 14.4 | | 14.3 | 15.02 |
| $\alpha 20$-450×$10^{-6}$ cm/cm/°C | 15.8 | 14.8 | | 15.3 | 15.60 |
| $\alpha 20$-Mg×$10^{-6}$ cm/cm/°C | 17.0 | 16.8 | 18.22 | 16.5 | 16.92 |
| Mg, °C | 480 | 430 | 444 | 485 | 485 |
| Fibre softening points, °C | 570 | 575 | 526 | 573 | 575 |
| $\log_{10} \rho$ at— | | | | | |
| 100° C | 11.10 | ¹11.0 | ¹10.8 | ¹11.0 | ¹11.0 |
| 150° C | 9.40 | | | | |
| 200° C | 8.00 | | | | |
| 250° C | 6.85 | | | | |
| 300° C | 5.95 | | | | |

| | 6 | 7 | 8 | 9 | 10 |
|---|---|---|---|---|---|
| Constituent oxides: | | | | | |
| $SiO_2$ | 42.0 | 42.0 | 50.0 | 44.0 | 42.0 |
| $Li_2O$ | | | | | |
| $Na_2O$ | 17.0 | 17.0 | 18.0 | 18.0 | 17.0 |
| $K_2O$ | 13.0 | 12.0 | 15.0 | 15.0 | 13.0 |
| BaO | 5.0 | 8.0 | 2.0 | 6.0 | 5.0 |
| SrO | 5.0 | 8.0 | 2.0 | 6.0 | 6.0 |
| $TiO_2$ | 15.0 | 13.0 | 13.0 | 4.0 | 10.0 |
| ZnO | 1.0 | | | 7.0 | 7.0 |
| $ZrO_2$ | | | | | |
| $Al_2O_3$ | 2.0 | | | | |
| Properties: | | | | | |
| Durability | good | good | good | fairly good | good |
| $\alpha 20$-350×$10^{-6}$ cm/cm/°C | 14.88 | 14.75 | 15.07 | 16.68 | 15.60 |
| $\alpha 20$-400×$10^{-6}$ cm/cm/°C | 15.20 | 15.24 | 16.03 | 17.59 | 16.11 |
| $\alpha 20$-450×$10^{-6}$ cm/cm/°C | 15.89 | 15.77 | 16.36 | | 17.54 |
| $\alpha 20$-Mg×$10^{-6}$ cm/cm/°C | 17.50 | 17.11 | 17.60 | 18.28 | 17.60 |
| Mg, °C | 492 | 490 | 492 | 434 | 467 |
| Fibre softening points, °C | 590 | 574 | 580 | 525 | 553 |
| $\log_{10} \rho$ at— | | | | | |
| 100° C | ¹11.0 | 11.0 | 10.25 | | 10.85 |
| 150° C | | 9.45 | 8.75 | | 9.20 |
| 200° C | | 8.20 | 7.60 | | 7.90 |
| 250° C | | 7.30 | 6.70 | | 6.90 |
| 300° C | | 6.55 | 5.95 | | 6.05 |
| 350° C | | 5.90 | 5.30 | | 5.40 |

| | 11 | 12 | 13 | 14 | 15 | 16 |
|---|---|---|---|---|---|---|
| Constituent oxides: | | | | | | |
| $SiO_2$ | 48.0 | 45.0 | 42.0 | 32.0 | 48.0 | 32.0 |
| $Li_2O$ | | 5.0 | | | 3.0 | |
| $Na_2O$ | 17.0 | 15.0 | 17.0 | 17.0 | 14.0 | 4.0 |
| $K_2O$ | 13.0 | 13.0 | 13.0 | 14.0 | 13.0 | 27.0 |
| BaO | 5.0 | 4.0 | 7.0 | 3.0 | 5.0 | 3.0 |
| SrO | 6.0 | 4.0 | 3.0 | 4.0 | 6.0 | 4.0 |
| $TiO_2$ | 10.0 | 10.0 | 15.0 | 30.0 | 8.0 | 30.0 |
| ZnO | 1.0 | 4.0 | 1.0 | | 3.0 | |
| $ZrO_2$ | | | | | | |
| $Al_2O_3$ | | | | 2.0 | | |
| Properties: | | | | | | |
| Durability | good | fairly good | good | good | very good | very good |
| $\alpha 20$-350×$10^{-6}$ cm/cm/°C | 14.42 | 16.31 | 14.88 | 14.71 | 15.60 | 14.11 |
| $\alpha 20$-400×$10^{-6}$ cm/cm/°C | 14.81 | 18.12 | 15.20 | 15.10 | 16.40 | 14.62 |
| $\alpha 20$-450×$10^{-6}$ cm/cm/°C | 15.39 | | 15.89 | 15.61 | | 16.59 |
| $\alpha 20$-Mg×$10^{-6}$ cm/cm/°C | 16.78 | 18.38 | 17.50 | 17.63 | 16.40 | 17.11 |
| Mg, °C | 493 | 414 | 492 | 496 | 437 | 466 |
| Fibre softening points, °C | 580 | 504 | 590 | 584 | 525 | 554 |
| $\log_{10} \rho$ at— | | | | | | |
| 100° C | 11.35 | 12.25 | 10.95 | | 12.70 | |
| 150° C | 9.65 | 10.40 | 9.30 | | 10.75 | |
| 200° C | 9.30 | 8.90 | 7.95 | | 9.10 | |
| 250° C | 7.20 | 7.75 | 6.90 | | 7.80 | |
| 300° C | 6.30 | 6.80 | 6.00 | | 6.70 | |
| 350° C | 5.60 | 5.95 | 5.30 | | 5.80 | |

¹ Approximately.

All the glasses whose compositions are given in Table 1 can be used for sealing to copper and to a high expansion austenitic steel of composition, for example, 7% to 10% nickel, 17% to 20% chromium, and the remainder iron with small quantities of carbon, silicon, sulphur, phosphorus, manganese and titanium. Glasses 2, 4, 5, 10, 11 and 15, however, cannot always be relied upon to form satisfactory seals with copper, but are particularly suitable for sealing to steel of the kind referred to. Glasses 3, 9 and 12 furthermore are particularly suitable for forming a compression seal with aluminium.

The effects of small additions of some colouring oxides on the expansion coefficients and Mg points of a glass according to the invention are illustrated in Table 2, below: in each case the quantity of colouring oxide specified has been substituted for the same proportion of silica, by weight, in a glass of composition No. 1 in Table 1: the expansion and Mg point of glass 1 are also included in Table 2, for comparison.

*Table 2*

| Glass composition 1 | Coeff. of expansion×10⁻⁶ cm./cm./° C. | | | | Mg point, ° C. |
|---|---|---|---|---|---|
| | $\alpha$20–350 | $\alpha$20–400 | $\alpha$20–450 | $\alpha$20–Mg | |
| | 14.6 | 15.2 | 15.8 | 17.0 | 480 |
| Colouring oxide, percent: | | | | | |
| $WO_3$, 0.5% | 14.59 | 14.91 | 15.31 | 16.90 | 497 |
| $CoO$, 0.1% | 15.50 | 15.88 | 16.59 | 18.31 | 491 |
| $Fe_2O_3$, 1.0% | 14.79 | 15.20 | 15.70 | 17.20 | 501 |
| $CuO$, 1.0% | 15.19 | 15.59 | 16.47 | 18.30 | 483 |

One specific method of manufacturing a glass in accordance with the invention will now be described by way of example.

In this example, for the production of a glass of nominal composition 1 in Table 1, above, a typical batch of raw materials is prepared by mixing the following ingredients, in the amounts stated:

| | Kgms. |
|---|---|
| Dutch sand ($SiO_2$) | 29.400 |
| Witherite ($BaCO_3$) | 2.825 |
| Strontium carbonate | 3.990 |
| Sodium nitrate | 1.920 |
| Sodium carbonate | 19.100 |
| Potassium carbonate | 14.400 |
| Anatase ($TiO_2$) | 14.000 |

The above batch is introduced, in several portions, into a small tank furnace, the walls of which are composed of mullite-type blocks consisting of approximately 50% silica and 50% alumina by weight. The material in the tank is heated to 1300° C. to 1320° C., and is maintained at this temperature for 3 to 4 hours after the addition of the last portion of batch, to complete the founding of the glass.

Analysis of one particular glass produced in this manner revealed that the composition of the glass was as follows:

| | Percent |
|---|---|
| $SiO_2$ | 42.3 |
| $Na_2O$ | 16.9 |
| $K_2O$ | 14.0 |
| $BaO$ | 2.4 |
| $SrO$ | 3.3 |
| $TiO_2$ | 20.4 |
| $Al_2O_3$ | 0.6 |

The glasses in accordance with the invention are suitable for the fabrication of blown, drawn or moulded ware, such as glass components of the envelopes of electric discharge devices, and such components can be sealed directly to components formed of metals or alloys of the type specified, by heating contacting parts of the glass and metal components to a suitable temperature between 600° C. and 660° C. at which the glass flows readily. The glasses may also be employed in powder form for sealing two metal components together, the loose glass powder being introduced without a binder between the surfaces of the metal components to be united and the whole assembly being heated to a suitable temperature as aforesaid. One of the most important uses of these glasses is, in the form of glass beads, for sealing loading-in conductors into apertures in metal components: the beads may be formed by any of the well-known techniques which comprise heating a short length of glass tubing slipped over the conductor, or sintering glass powder, or applying the softened end of a glass rod to the surface of a conductor and rotating the rod and the conductor relative to one another until a bead of glass has been deposited around the conductor; in each case the seal is formed by heating the bead and metal components to a suitable temperature above 600° C.

In many cases the most convenient type of bead to use is that formed of sintered glass powder.

Glass powder, for use either in the loose state or for forming sintered glass beads, can be produced from any of the glasses with which the invention is concerned by dragading, that is to say by pouring the molten glass into water to form coarse granular material from which the water is immediately removed by siphoning and which is then dried at 120° C. to 200° C.; the dragaded glass is then ball milled to reduce it to powder mainly consisting of particles capable of passing through a sieve having 40 meshes to the linear inch but retained on a sieve having 200 meshes to the linear inch.

For forming sintered glass beads, for example from glass 1 in Table 1, glass powder produced as described above is mixed with a binder consisting of polybutyl methacrylate, 100 grams of glass powder being mixed with 3 to 5 grams of polybutyl methacrylate dissolved in 25 cc. of sulphur-free toluene; the mixture is dried in air at approximately 40° C. for at least 24 hours, with occasional stirring to prevent caking. The dried, bonded powder is granulated through a 40 mesh sieve, and is then compacted under a pressure of 4 to 5 tons per square inch in a mould to form beads of the required size and shape and provided with apertures for the insertion of conductors, if required.

The compacted beads are heated in stages to effect first volatilisation of the binder, and then sintering. The beads are first heated slowly in air to 200° C.–250° C. and are maintained at this temperature for ½ to 1 hour to ensure complete removal of the binder. The temperature is then raised slowly to 550° C.–560° C., the air supply being shut off at approximately 450° C.; the beads are maintained at 550–560° C. for about 10 minutes to effect sintering. The beads are allowed to cool in the oven in which the heating has been carried out, the oven door being left slightly open to prevent over-sintering.

It is to be noted that in view of the absence of lead oxide from the compositions of the glasses of the invention, sintered glass components can be made easily without risk of reduction of the said oxide to metallic lead.

The glasses in accordance with the invention are particularly advantageous for use in the manufacture of some electrical devices in which it is desirable to employ copper or aluminium as part of the envelope, in view of the good cold welding properties of these metals, or to employ copper or silver as leading-in wires. Copper and silver are especially advantageous metals to use for the latter purpose, on account of their high electrical and thermal conductivities: such leads can in particular serve in some cases to conduct heat away from the device rapidly, so as to enable the device to be operated at higher temperatures, and therefore at higher currents, than is possible with leads of lower conductivity. The present invention, in providing glasses capable of forming matching seals with copper, makes possible the production of satisfactory seals between glass and thick copper bodies, and hence the manufacture of electrical devices incorporating relatively thick copper leads, for example 2 to 3 mm. in diameter. Copper components of even larger dimensions may also be sealed together satisfactorily by means of these glasses; thus copper rods of diameter of the order of 20 mm. have been successfully sealed into copper discs of a similar order of thickness.

There is claimed:

1. A glass suitable for sealing directly to a high thermal expansion metal or alloy, having a composition in the range of 32% to 50% silica ($SiO_2$), 4% to 27% sodium oxide ($Na_2O$), 4% to 27% potassium oxide ($K_2O$), 0 to 5% lithia ($Li_2O$), 2% to 8% barium oxide (BaO), 2% to 8% strontium oxide (SrO), 4% to 30% titanium dioxide ($TiO_2$), 0 to 7% zinc oxide (ZnO), 0 to 2% zirconia ($ZrO_2$), and 0 to 2% alumina ($Al_2O_3$), the total content of alkali metal oxides ($Na_2O+K_2O+Li_2O$) being 29% to 33%, the total content of $TiO_2+ZnO$ being at least 11%, and the total content of $SiO_2+TiO_2$ being not less than 46%.

2. A glass according to claim 1 wherein the proportions of sodium oxide and potassium oxide are in the ranges of 12% to 18% $Na_2O$ and 11% to 15% $K_2O$.

3. A glass according to claim 1 wherein more than half the alkali metal oxide content is $Na_2O$ and no $Li_2O$ is present.

4. A glass according to claim 1 having a composition in the range of 42% to 50% silica ($SiO_2$), 29% to 33% alkali metal oxides ($Na_2O+K_2O$) of which not less than half the total is sodium oxide, 4% to 10% alkaline earth metal oxides (BaO+SrO), 14% to 30% titanium dioxide ($TiO_2$) and 0 to 2% zinc oxide (ZnO).

5. A glass according to claim 1, which contains not more than 1% of colouring material consisting of at least one oxide of a metal which is a member of the group consisting of manganese, chromium, nickel, vanadium, tungsten, iron, copper, cobalt, such material being substituted for an equal weight of silica in the glass composition.

6. A glass-to-metal seal consisting of a glass according to claim 1 sealed to a metal or alloy of the high thermal expansion type.

7. A glass-to-metal seal consisting of a glass according to claim 1 sealed to a high thermal expansion metal which is a member of the group consisting of copper, silver, aluminum and austenitic steel of composition 7%–10% nickel, 17%–20% chromium and the remainder iron with small proportions of carbon, silicon, sulphur, phosphorus, manganese and titanium.

8. An electrical device having an envelope which includes a glass-to-metal seal according to claim 7.

9. A glass suitable for sealing directly to copper, and composed of 42.0% $SiO_2$, 17.0% $Na_2O$, 14.0% $K_2O$, 3.0% BaO, 4.0% SrO, and 20.0% $TiO_2$, by weight.

References Cited in the file of this patent

UNITED STATES PATENTS

| | | |
|---|---|---|
| 2,520,663 | Tromp | Aug. 29, 1950 |
| 2,523,264 | Armistead | Sept. 26, 1950 |
| 2,523,266 | Armistead | Sept. 26, 1950 |
| 2,743,553 | Armistead | May 1, 1956 |